United States Patent [19]

Schievelbusch

[11] Patent Number: 5,273,501
[45] Date of Patent: Dec. 28, 1993

[54] DRIVING HUB FOR A VEHICLE

[75] Inventor: Ulrich Schievelbusch, Kassel, Fed. Rep. of Germany

[73] Assignee: Fichtel & Sachs AG, Schweinfurt, Fed. Rep. of Germany

[21] Appl. No.: 930,722

[22] Filed: Aug. 14, 1992

[30] Foreign Application Priority Data

Aug. 16, 1991 [DE] Fed. Rep. of Germany ....... 4127043

[51] Int. Cl.$^5$ .......................... F16H 15/00; F16H 3/72
[52] U.S. Cl. ........................ 476/40; 476/45; 475/192
[58] Field of Search .............. 476/40, 45, 46; 475/190, 191, 192, 197

[56] References Cited

U.S. PATENT DOCUMENTS

| 1,859,502 | 5/1932 | Erban . | |
| 1,868,234 | 7/1932 | Hunt | 475/192 |
| 4,735,430 | 4/1988 | Tomkinson et al. | 280/236 |
| 5,069,655 | 12/1991 | Schievelbusch | 475/192 X |

FOREIGN PATENT DOCUMENTS

| 0432742 | 6/1991 | European Pat. Off. . | |
| 424994 | 2/1926 | Fed. Rep. of Germany . | |
| 2136243 | 2/1972 | Fed. Rep. of Germany . | |
| 3825860 | 2/1989 | Fed. Rep. of Germany | 476/40 |
| 3940919 | 6/1991 | Fed. Rep. of Germany . | |
| 377165 | 6/1964 | Switzerland | 476/45 |
| 8900256 | 1/1989 | World Int. Prop. O. . | |

OTHER PUBLICATIONS

F. R. Whitt et al., "Bicycling Science", MIT Press, 1988, p. 282.

Primary Examiner—Rodney H. Bonck
Assistant Examiner—David W. Laub
Attorney, Agent, or Firm—Brumbaugh, Graves, Donohue & Raymond

[57] ABSTRACT

The drive hub for a vehicle, particularly a bicycle, comprises a hub axle 1, a hub sleeve 9 adapted to rotate in relation to the hub axle 1 and a driver 13 mounted to rotate on the hub axle 1. The driver 13 drives the hub sleeve 9 through a friction gear 17 of which the first toroidal disc 25 is rotationally rigidly connected to the hub axle 1, of which the second toroidal disc 27 is connected to the driver 13 via a ratchet free wheel coupling 23 and drives the friction wheel carrier 43 which is provided with a plurality of friction wheels 35 and which is, in force-locking manner, connected to the hub sleeve 9 via an expanding coupling 20. The infinitely adjustable transmission ratio of the friction gear 17 is controlled from within the hub axle 1 via a linkage 53 which, via a coupling ring 47, entrains the pivotally mounted lever 39c of the pivot frames of the friction wheels 35. The system's own transmission of the friction gear 17 from the driver 13 to the friction wheel carrier 43 downwards can be compensated by rotary speed increasing measures both at the chain drive and also within the friction gear 17 by asymmetrical disposition of the toroidal zones.

20 Claims, 3 Drawing Sheets

DRIVING HUB FOR A VEHICLE

BACKGROUND OF THE INVENTION

The invention relates to a driving hub for a vehicle and particularly to a driving hub with a friction gear the reduction ratio of which is infinitely variable adjustable.

Known from U.S. Pat. No. 4,735,430 is a driving hub for a bicycle, of which the hub sleeve, rotatably mounted in the bicycle frame, is driven by a friction gear disposed in the hub sleeve with a hub axle rotatingly driven by the pedals. Two toroidal discs disposed on the axle are coupled to each other frictionally by a plurality of friction wheels. The friction wheels are rotatably mounted on king pins which are in turn pivotally mounted on a stationary friction wheel carrier. One of the two toroidal discs is non-rotatable but is axially displaceable on the hub axle and is pressed against the friction wheels by an expanding coupling provided with sloping thrust faces, as soon as the hub axle is driven. The other toroidal disc which is rotatably disposed on the hub axle is connected to the hub sleeve by a free wheel coupling and a planetary gear mechanism with stationary planet wheels. For infinitely variable adjustment of the transmission ratio of the friction gear, the king pins of the friction wheels are extended radially outwardly and engage sloping thrust slots in a control sleeve enclosing the friction gear and mounted to rotate within the hub sleeve. By rotation of the control sleeve by means of a traction cable arrangement, the angular position of the friction wheels in relation to the hub axle and thus the transmission ratio of the friction gear can be altered.

In the case of the prior art driving hub, the hub sleeve is radially guided on a housing of the friction gear via the control sleeve. In this case, the wheel loading makes adjustment of the transmission ratio difficult. In the case of the known driving hub, since both toroidal discs have to be movably guided, there are not only production problems but also the operational reliability and effective life are undesirable influenced. Finally, the known driving hub calls for special fitting means, since the hub axle has to be rotatably mounted in the bicycle frame, otherwise than with conventional driving hubs. Control via the interposed control sleeve is a complicated non-standard construction. The planetary gearing is absolutely essential in order that the hub sleeve can be driven in the direction of rotation of the driver; however, this impairs the efficiency of the driving hub and increases the hub weight as well as the costs of construction.

An improvement on this hub is disclosed by EP 0 432 742 A1 As is conventional with bicycles, the hub axle is adapted to be rigidly fitted into the bicycle frame, with a linkage to the friction gear control passing through the hollow hub axle. The driver is rotationally rigidly connected to the friction wheel carrier and drives a second toroidal disc in that, shifted up to high speed, the friction wheels roll on the first toroidal disc which is rotationally rigidly connected to the hub axle. The king pins which point towards the axle center and which are pivotable in the axle plane are of spherical construction at their inner end and are guided in the outer ring of a ball bearing which, by means of a thrust block, can be moved axially to and fro by the linkage which extends through the hollow hub axle. The second toroidal disc, running at a higher rotary speed, is shifted back to low speeds by a downstream planetary gearing.

SUMMARY OF THE INVENTION

The invention solves the problem of providing a vehicle drive hub the transmission ratio of which is infinitely adjustable. It is intended that the drive hub should be of simple and favorably costed design. Furthermore, it is intended to provide a high level of efficiency.

The invention is based on a driving hub for a vehicle and comprising

- a hub axle which establishes an axis of the hub,
- a hub sleeve which equiaxially encloses and is rotatable in relation to the hub axle,
- a driver mounted to rotate in relation to the hub sleeve,
- a friction gear disposed inside the hub sleeve and which comprises two axially oppositely disposed toroidal discs and, distributed in the peripheral direction of the toroidal discs,
- a plurality of friction wheels which connect the toroidal discs to one another in frictional fashion and which is disposed in the force path between the driver and the hub sleeve, the friction wheels being rotatably mounted on king pins, the king pins being in turn pivotally mounted on a friction wheel carrier via pivot spindles extending in the peripheral direction of the toroidal discs,
- at least one coupling arrangement which, when the hub is being driven by the driver, closes the force path between driver and hub sleeve and opens the force path when the driver is not driving,
- a control arrangement which can be actuated from outside and which pivots the friction wheels jointly about the pivot axes for infinitely variable adjustment of the transmission ratio of the friction gear, a first disc of the two toroidal discs which is farther removed from the driver than the second of the two toroidal discs being rotationally rigid on the hub axle.

The improvement according to the invention resides in the fact that the second toroidal disc is coupled to the driver for joint rotation at least in the direction of driving rotation and in that the friction wheel carrier is coupled to the hub sleeve for joint rotation at least in the driving direction of rotation. According to the invention, therefore, the flow of force from the driver passes through that toroidal disc which is rotationally rigidly coupled to the driver and in turn this toroidal disc drives the friction wheels which roll on the oppositely disposed stationary toroidal disc, and the said friction wheels drive the friction wheel carrier. The friction wheel carrier in turn is rotationally rigidly coupled by the hub sleeve. A planetary gearing for reversing the direction of rotation is not required with this arrangement. Nor is any planetary gearing required in order for the difference in rotary speed between the second toroidal disc and the friction wheel carrier since it is generally sufficient to use a gear wheel with a reduced number of teeth in order to compensate for the slower rotation of the hub sleeve compared with the driver. By dispensing with the planetary gearing, the efficiency is markedly increased which is particularly important in the case of bicycle drive hubs, since these are in competition with the chain gear mechanisms which offer a particularly high level of efficiency. Furthermore, the omission of the planetary gearing makes for a more favorably costed construction and reduced weight. Adjustment of the transmission ratio of the friction gear which is manual or may be achieved by a corresponding electrically operated positioning drive can be accomplished via a linkage which is guided through the hollow hub axle.

When conventional pinion transmissions are used, even when a small hub-driving pinion is used, it may be advantageous to increase still further the maximum rotary speed of the hub sleeve for a given rotary speed of the driver. To this end, it is proposed that the toroidal surface of the first toroidal disc should extend farther in a radial direction pointing to the the axle than the toroidal surface of the second toroidal disc, and that the toroidal surface of the second toroidal disc should extend farther in a radial direction pointing away from the axle than the toroidal surface of the first toroidal disc. Since the first toroidal disc is rigidly connected to the hub axle, extension of the toroidal track on the first toroidal disc inwardly towards the axle presents no difficulty. As a result of the indicated measures, the transmission range of the friction gear is widened towards the high speed side. Since the toroidal surface of the first toroidal disc does not have to extend so far in the direction away from the axle, it is readily possible to provide an annular space between the outer periphery of the first toroidal disc and the inner periphery of the hub sleeve.

This annular space can accommodate a coupling bush which connects the friction wheel carrier to the hub sleeve via a coupling, this coupling preferably being an expanding coupling. The coupling bush therefore constitutes a rotationally rigid connection between the friction wheel carrier and the hub sleeve, the expanding coupling incorporated into the force flow being capable of being disposed in an area offering sufficient space for fitment, namely between the inside of one end wall of the hub and the first toroidal disc. The purpose of the expanding coupling is to press the two toroidal discs against the friction wheels with increasing force as soon as the driving moment between driver and sleeve increases. In this way, with minimal driving moment, a particularly smooth running of the hub is ensured on the one hand while on the other, slippinq of the friction wheels is avoided.

In a particularly advantageous embodiment of the invention, the hub sleeve is constructed to accommodate the inner axial forces of the friction gear. Correspondingly, the hub axle is relieved of axial forces and can therefore be of mechanically less stable construction, so that it is lighter in weight and more favorably costed. By reason of its relatively large material cross-sectional area, the hub sleeve itself can also readily accommodate the comparatively high maximum axial forces which arise in the case of the friction gear according to the invention.

In particular, it is preferably envisaged that the hub sleeve be provided at both axial ends with respective hub end walls, that in a direction parallel with the axis of the hub, the expanding coupling be braced on one side on the first toroidal disc and on the other on the inside of one of the two hub end walls and that provided on the other hub end wall is a pivot bearing which, in a direction parallel with the axis of the hub, is braced on one side on the second toroidal disc and on the other on the inside of the other hub end wall, and that at least one of the two toroidal discs be mounted on the hub for movement in a direction parallel with the axis of the hub. Thus, the hub sleeve encloses the friction gear like a housing. In this case, in order to ensure favorably costed production and simplified assembly and dismantling, it is suggested that the hub sleeve consist of at least two parts which can be bolted together.

The two toroidal discs are adapted for axial movement in relation to each other in order to allow the desired increase or reduction in the pressure which is respectively applied to the friction wheels. Preferably, it is to this end envisaged that the first toroidal disc be rigidly disposed on the hub axle, that the second toroidal disc be movably disposed on the hub axle, and that the hub sleeve be mounted for movement on the hub axle in a direction parallel with the axis of the hub.

This provides for simple mechanically rugged construction with the possibility of the inner axial forces being accommodated by the hub sleeve. In its axial position, the hub sleeve adjusts itself automatically according to the prevailing forces. For example, if the driving moment increases, then the expanding coupling moves one hub end wall away from the first toroidal disc with the result that the other hub end wall is pressed increasingly against the movably mounted second toroidal disc, so pressing this in the direction of the first toroidal disc. In addition to the inner axial forces emanating from the road wheels, also the forces originating from the control arrangement are accommodated by the hub sleeve, in fact via the friction wheels, the friction wheel carrier and the coupling bush.

Particularly preferably, the pivot bearings disposed at the two hub end walls are constructed as angled ball bearings. This way of supporting the axial forces has the advantage that the hub sleeve only has to be radially braced on the hub axle. Elastic deformations which are inevitable in an axial direction by reason of the considerable forces which arise, cannot lead anywhere to any form of coercion with this arrangement. So that the radial ball bearings have clearance to move between the hub end walls and the hub axle in a direction parallel with the axis of the hub, despite the fact that the manufacturing costs are small, it is proposed that the radial ball bearings be constructed with a ball race with a large osculating radius or with a cylindrical ball race. Therefore, the hub sleeve only needs to be radially braced on the hub axle. By means of the expanding coupling and its inclined ball bearing, axial forces are transmitted in one direction from the sleeve to the fixed first toroidal disc; axial forces in the other direction are transmitted via the inclined ball bearing on the other end of the sleeve, via the second toroidal disc and via the friction wheels to the first toroidal disc which is rigid with the axle. This form of construction not only ensures the equalization of elastic deformations but also the equalization of inaccuracies in tolerances.

In order to allow a constant co-rotation of the bicycle pedals even while the hub is not being driven, and while ensuring reliable functioning and ease of manufacture, it is proposed that the second toroidal disc should be rotationally rigidly connected to the driver in the driving direction of rotation via a free wheel coupling, preferably a ratchet free wheel coupling.

In order to ensure an initial pretensioning of both toroidal discs in the direction of each other, the use of at least one pretensioning spring is suggested which is biased at one end on the hub sleeve and at the other on one of the two toroidal discs. This pretensioning spring may be constructed as a thrust spring biased at one end on the inside of the second hub end wall and at the other on an outer ring of the inclined ball bearing inserted between the second hub end wall and the second toroidal disc.

Furthermore, it is advantageous if the restoring moments which occur particularly at the first toroidal disc when the vehicle is in low gear, by a reaction moment lever in the same way as with back pedal brake hubs in which the braking moments are derived. Therefore, in contrast to this, where the hub according to the invention is concerned, reaction moments have to be derived which are the difference between the driving moment and the driven moment.

In order to achieve an inexpensively produced and yet mechanically high capacity mounting of the friction wheels, it is suggested that the friction wheels should be mounted in pivoting frames which are in turn rotatably mounted in the friction wheel carrier to rotate about their respective pivoting axis by virtue of bearing pins.

The control arrangement preferably comprises a linkage guided inside the hub axle and, articulatingly coupled to the king pins of the friction wheels, a shifting element guided on the hub axle and adapted for displacement along the hub axle by means of the linkage. The shifting element in turn preferably comprises an outer bearing ring, an inner bearing ring as well as a ball bearing connecting the outer bearing ring and inner bearing ring.

In order to minimize displacement forces when adjusting the transmission ratio of the friction gear, it is suggested that the pivot frames be provided with levers which engage the outer bearing ring at appropriate application points, the distance of which from the pivot axis of the pivoting frames corresponds substantially to the distance between the axis of the hub and the pivot axis of the pivot frames.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE DRAWINGS

Figure 1:
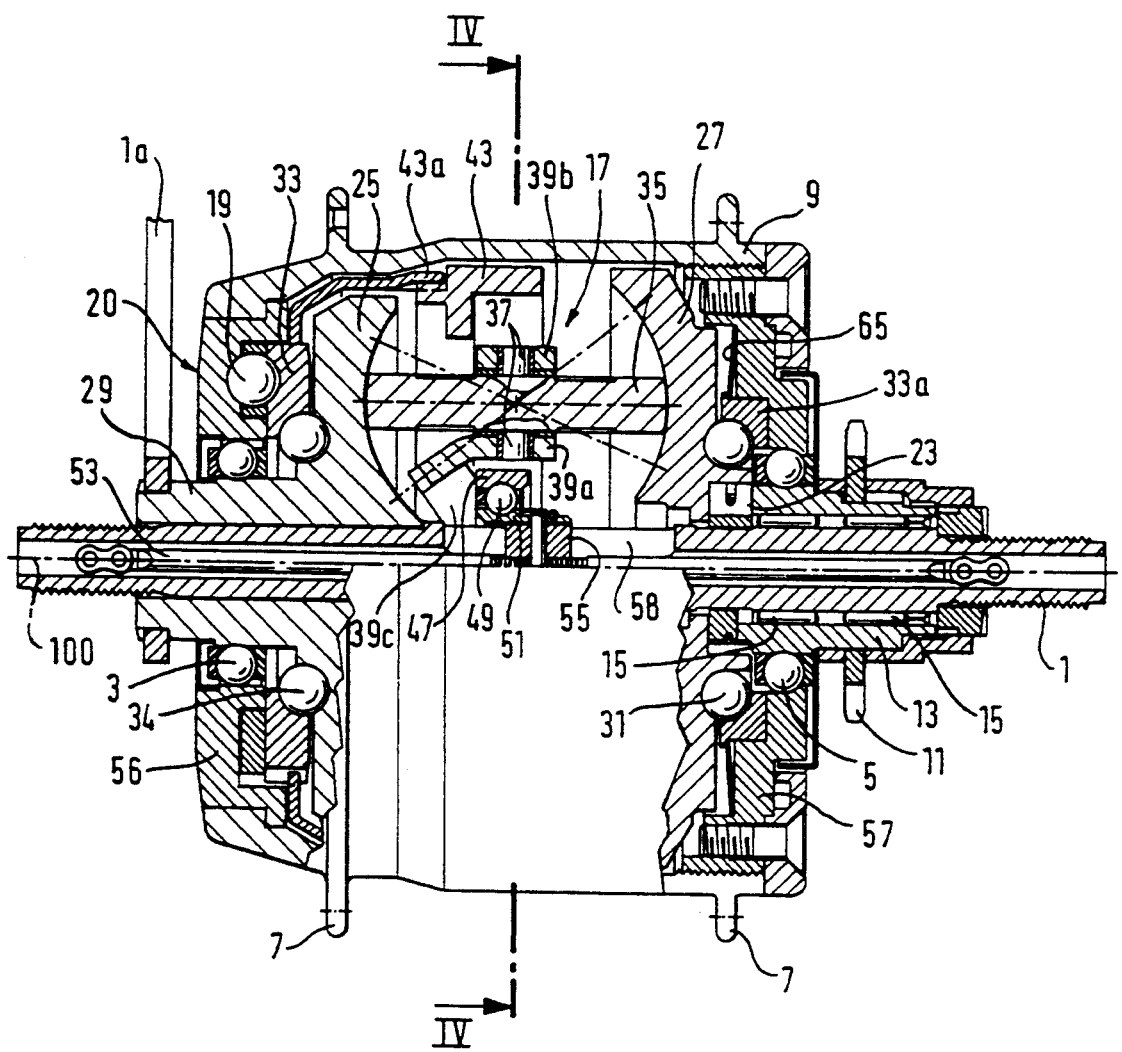
FIG. 1 shows a longitudinal section through the drive hub.

The drive hub shown in the drawings comprises a hub axle 1 intended to be rotationally rigidly fixed to the frame of the vehicle and on which, in a manner to be explained in greater detail hereinafter, a hub sleeve 9 provided with spoke flanges 7 is rotatably mounted by means of ball bearings 3 and 5. The longitudinal axis of the hub axle 1 constitutes the central axis 100 of the drive hub.

Axially laterally beside the hub sleeve 9 there is on the hub axle 1 a driver 13 which is provided with a chain sprocket 11 and which is rotatably mounted on needle bearings 15.

Disposed inside the hub sleeve 9 is a friction gear 17 which is coupled by a ratchet free wheel coupling 23 to the driver 13 while it is coupled directly to the hub sleeve 9 via balls 19 in an expanding coupling 20. The balls 19 project into depressions constructed with rising surfaces and provided both in a coupling ring 33 and also in a sleeve ring 56. The torque from the driver 13 is transmitted via the ratchet free wheel coupling 23, the friction gear 17 and the expanding coupling 20 directly to the hub sleeve 9. If, during travel, the driver 13 is stationary, then the friction gear 17 co-rotates since it is being driven by the sleeve 9 via the balls 19 in the expanding coupling 20, while the flow of force through the ratchet free wheel coupling 23 is interrupted.

The transmission ratio of the friction gear 17 is infinitely adjustable. In the friction gear 17, two toroidal discs 25 and 27 are disposed at an axial distance from each other, a first toroidal disc 25 being supported rigidly on the hub axle 1 while on a projection 29 it additionally carries the bearing 3 of the hub sleeve 9. The first toroidal disk is further provided with a reaction moment lever 1a adapted to be connected to a vehicle frame to accommodate reaction moments.

Figure 4:
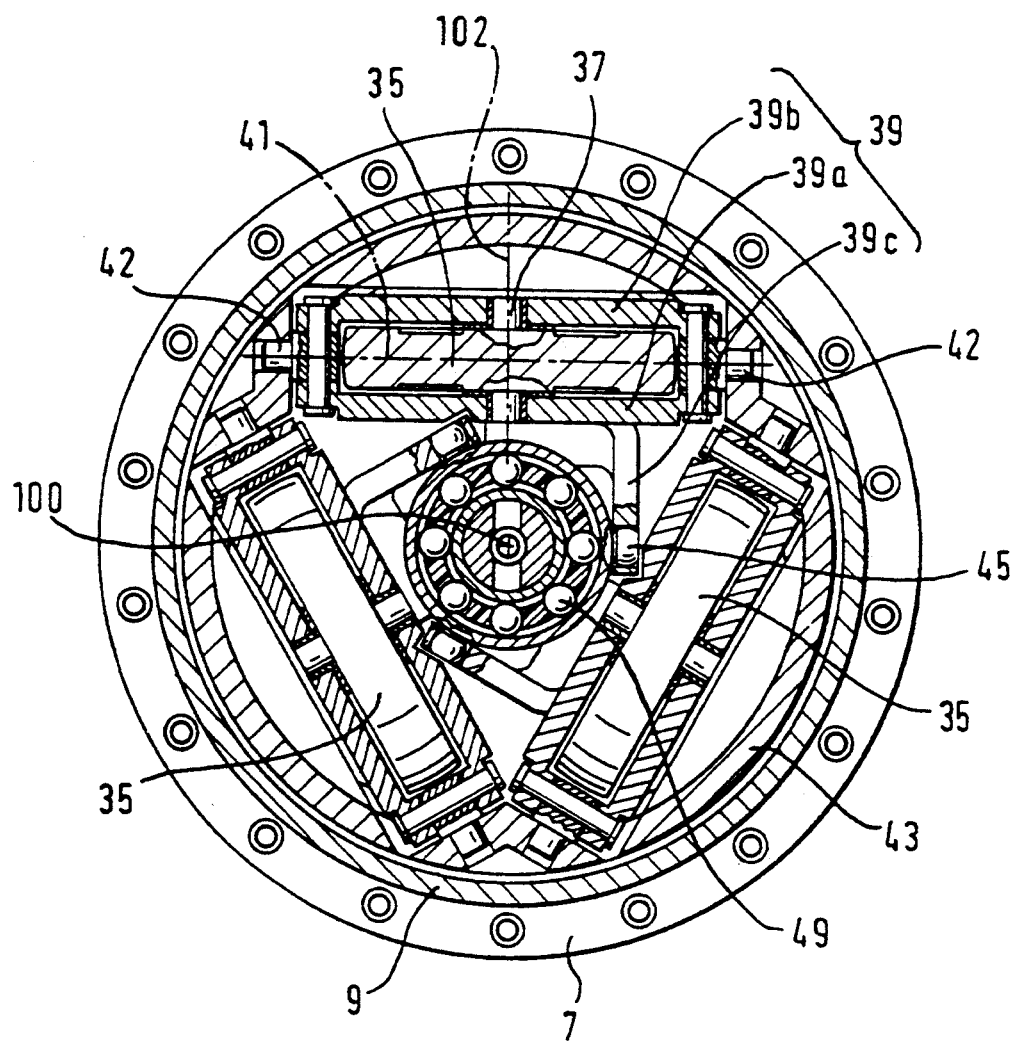
FIG. 4 is a cross-section through the drive hub in the centre of the friction gear, taken on the line IV—IV in FIG. 1.

The second toroidal disc 27 is rotatably connected via an inclined ball bearing 31 to a thrust ring 33a in a screw cover 57 which is screwed to the hub sleeve 9 and which is in turn mounted on the driver 13 by means of the ball bearing 5. Disposed between the two toroidal discs 25 and 27 and angularly offset to one another by 120° are three friction wheels 35 which provide a frictional connection between the toroidal discs 25 and 27. Each of the friction wheels 35 is rotatably mounted on a king pin 37, of which the axis of rotation 102 cuts the longitudinal axis (axis 100) of the hub axle 1. As can be best seen from FIG. 4, the king pins 37 are mounted in pivot frames 39 which are in turn mounted on a common friction wheel carrier 43 which is rotatably mounted on the hub axle 1. The pivot axes 41 lie in a common plane extending at right-angles to the hub axle 1, are at the same distance from the hub axle 1 and extend in a tangential direction in relation to this latter.

The pivot frame 39 consists of two plates 39a and 39b, one of which — 39a — carries a bent away lever 39c with a bore 45a. This engages ball heads 45 on a coupling ring 47, so that the pivot frame 39 is articulatingly mounted. The coupling ring (outer bearing ring) 47 is connected via a ball bearing 49 to an inner bearing ring 51 mounted for axial displacement on the hub axle 1 and transmits the control movement of a control linkage 53 guided for displacement centrally in the hub axle 1 to the coupling ring 47. The control linkage 53 is displaceable via manually or electromechanically actuated positioning means, not shown, and carries a thrust block 55 connected to the inner bearing ring 51 through slots 58 in the hub axle 1. By axial displacement of the linkage 53, the friction wheels 35 are pivoted jointly about their pivot axes 41 so that the ratio of whichever is the adjusted effective track diameter $d$ of the toroidal disc 25 in relation to the effective track diameter $d_2$ of the toroidal disc 27 can be infinitely variably adjusted. Since the friction gear 17 is driven by the driver 13 via the second toroidal disc 27, the friction wheel carrier 43 always runs at a lower rotary speed. The ratio of the rotary speeds $n_2$ of the friction wheel carrier 43 to the rotary speed $n_1$ of 10 the toroidal disc 27 can be calculated as $n_2/n_1 = 1/(1+d_2/d_1)$.

With increasing torque at the driver 13, the axial force applied between the toroidal discs 25 and 27 is increased approximately in proportion by means of the expanding coupling 20 which, by the coupling ring 33, is applied via balls 34 against the first toroidal disc 25 which is rigid with the axle and presses the sleeve ring 56 which is rigidly connected to the hub sleeve 9, outwards to the left, so that the screw cover 57 which is connected to the hub sleeve 9 presses the second toroidal disc 27 against the friction wheels 35 via the thrust ring 33a and the balls 31. A predetermined initial pressure is provided by a thrust spring 65 between the thrust ring 33a and the screw cover 57 which in turn allows a clearance-free preliminary setting by virtue of the fact of its being screwed in the hub sleeve 9. The thrust ring 33a is mounted for axial displacement in the screw cover 57. As shown here, the thrust spring 65 is preferably a plate spring; other types of spring can also be used. The coupling ring 33 of the expanding coupling 20 is rotatingly coupled to the friction wheel carrier 43 via a coupling sleeve 43a, centering thereof being taken into account via the friction wheels 35 by an axial sliding fit between coupling sleeve 43a and coupling ring 33.

The transmission ratio of the drive hub has a bottom (hill) gear characteristic when there is additional gear mechanism. However, in order to arrange the total span of all possible transmission ratios so that there is no additional complication compared with conventional hub fitment, it is necessary to choose the smallest possible sprocket diameter and so have a given greater transmission upwards to compensate for a system-related drive hub transmission downwards. If necessary, a larger front crank wheel can be used if required. If these measures are not by themselves sufficient, then the remaining compensation can be provided by the friction gear itself, by reason of the asymmetry of its rolling areas on the toroidal disc tracks.

Whereas the toroidal disc 25 which is rigid with the axle has its track 25a extending to a point close to the axle so that the friction wheels 35 are also able to roll to that extent, the situation with the movable toroidal disc 27 is quite different: here, the area covered by the friction wheels is correspondingly shifted more radially outwards (toroidal track 27a). The annular space 104 not covered by the friction wheels 35 on the outside diameter of the first toroidal disc 25 which is rigid with the axle is available to accommodate the friction wheel carrier 43 and the coupling sleeve 43a.

Figure 2:
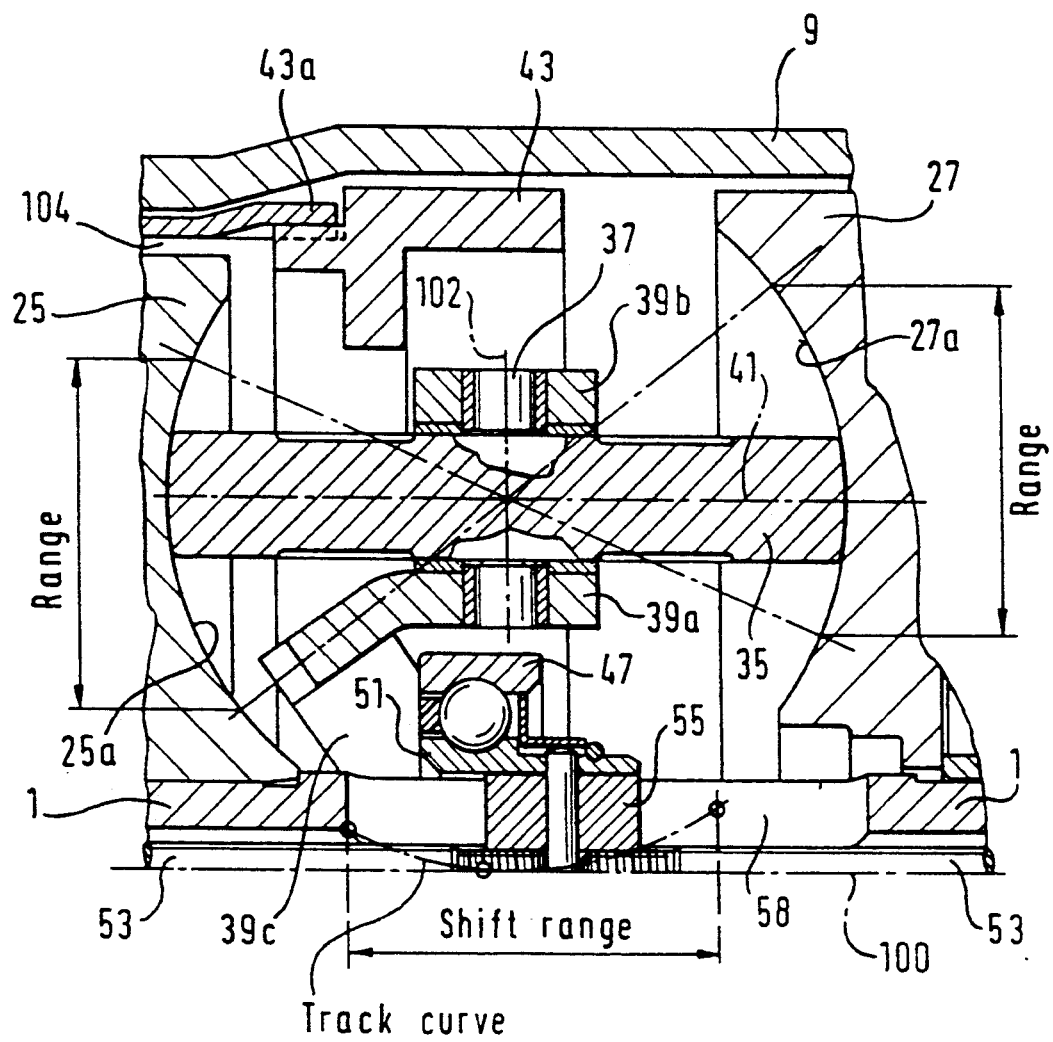
FIG. 2 shows an enlarged partial view taken from the longitudinal section in FIG. 1.
Figure 3:
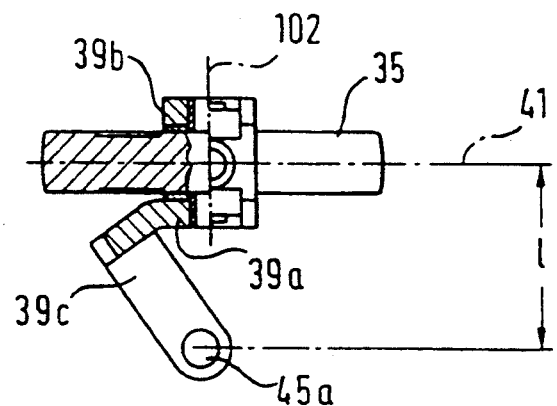
FIG. 3 is a partly sectional view of a pivot frame with friction wheel and control lever.

In FIG. 2, chain-dotted slanting lines correspond to the extreme pivot positions of the middle line 41 of a friction wheel 35, corresponding to a transmission range which is displaced towards top gear. The pivot range of the friction wheel 35 is designated as Range, and the linear range of thrust block 55 is designated as Shift range. In this embodiment, the measures for increasing the output speed of the hub can advantageously be combined with the measures aimed at achieving a compact construction.

Finally, in the case of the proposed method of construction, the accommodation of optimum length levers 39c is possible and they minimize the force needed for adjustment. Since the levers 39c according to FIG. 2 and FIG. 4 engage the coupling ring 42 laterally beside the axis 100 and in fact at the same height as the axis 100 (see FIG. 4), the effective lever length of the lever 39c corresponds to the distance between the axis 100 and the respective pivot axis 41. Due to axial displacements of the ball bearing 49 via the thrust block 55, the ball designated in FIG. 2 as Track curve and heads 45 become displaced, describing a spatial curve caused by the circular movement of the bore 45a in the levers 39c, with a corresponding rotation of the coupling ring 47 in relation to the inner bearing ring 51. In this way, the pivot frames 39 with their friction wheels 35 are rotated and thus the transmission ratio of the friction gear is altered.

Important aspects of the previously described invention are reproduced hereinafter:

The drive hub for a vehicle, particularly a bicycle, comprises a hub axle 1, a hub sleeve 9 adapted to rotate in relation to the hub axle 1 and a driver 13 rotatably mounted on the hub axle 1. The driver 13 drives the hub sleeve 9 through a friction gear 17, of which the first toroidal disc 25 is rotationally rigidly connected to the hub axle 1 and of which the second toroidal disc 27 is connected to the driver 13 via a ratchet free wheel coupling 23 driving the friction wheel carrier 43 which is provided with a plurality of friction wheels 35 and which is connected in force-locking manner to the hub sleeve 9 via an expanding coupling 20. The infinitely adjustable transmission ratio of the friction gear 17 is controlled from inside the hub axle 1 via a linkage 53 which, via a coupling ring 47, entrains the pivotally mounted levers 39c of the pivot frames of the friction wheels 35. The system's own transmission in the friction gear 17 from the driver 13 to the friction wheel carrier 43 to a slow speed can be compensated for by measures to increase the rotary speed both at the chain drive and also within the friction gear 17 by an asymmetrical disposition of the toroidal zones.

While specific embodiments of the invention have been shown and described in detail to illustrate the application of the inventive principles, it will be understood that the invention may be embodied otherwise without departing from such principles.

What I claim is:

1. A drive hub for a vehicle, comprising:
   a hub axle (1) which establishes an axis (100) of the hub,
   a hub sleeve (9) which equiaxially encloses and is rotatable in relation to the hub axle (1),
   a driver (13) mounted to rotate in relation to the hub sleeve (9) and the hub axle (1),
   a friction gear (17) disposed inside the hub sleeve (9) and which comprises two axially oppositely disposed toroidal discs (25, 27) and, distributed in the peripheral direction of the toroidal discs (25, 27), a plurality of friction wheels (35) which connect the toroidal discs (25, 27) to one another in frictional fashion and which is disposed in the force path between the driver (13) and the hub sleeve (9), the friction wheels (35) being rotatably mounted on king pins (37), the king pins (37) being pivotally mounted on a friction wheel carrier (43) via pivot spindles (41) extending in the peripheral direction of the toroidal discs (25, 27),
   at least one coupling arrangement (23) which, when the hub is being driven by the driver (13), closes the path of force between the driver (13) and the hub sleeve (9) and opens the path of force when the driver (13) is not driving, and a control arrangement (47, 51, 53) which pivots the friction wheels (35) jointly about the pivot spindles (41) for infinitely variable adjustment of the transmission ratio of the friction gear (17), the one (25) of the two toroidal discs (25, 27) which is farther from the driver (13) than the other (27) of the two toroidal discs (25, 27) being mounted on the hub axle (1) for joint rotation, wherein the second toroidal disc (27) is coupled to the driver (13) for joint rotation at least in the driving direction of rotation, and wherein the friction wheel carrier (34) is coupled to the hub sleeve (9) for joint rotation at least in the driving direction of rotation.

2. A drive hub according to claim 1, wherein a toroidal surface (25a) of the first toroidal disc (25) is extending farther in a radial direction pointing to the axis (100) than a toroidal surface (27a) of the second toroidal disc (27) and in that the toroidal surface (27a) of the second toroidal disc (27) is extending farther in a radial direction pointing away from the axis (100) than the toroidal surface (25a) of the first toroidal disc (25).

3. A drive hub according to claim 1, wherein a coupling sleeve (43a) is provided which extends into an annular space (104) between the first toroidal disc (25) and the hub sleeve (9) and which via a coupling connects the friction wheel carrier (43) to the hub sleeve (9).

4. A drive hub according to claim 3, wherein the coupling is an expanding coupling (20).

5. A drive hub according to claim 4, wherein the hub sleeve 9 is provided at both axial ends with respective hub end walls (56, 57), in a direction parallel with the axis (100) of the hub, the expanding coupling (20) is braced on one side on the first toroidal disc (25) and on the other on the inside of one (56) of the two hub end walls (56, 57), on the other hub end wall (57) a pivot bearing is provided which, in a direction parallel with the axis (100) of the hub, is braced on one side on the second toroidal disc (27) and on the other on the inside of the other hub end wall (57), and at least one (27) of the two toroidal discs (25, 27) is mounted on the hub for movement in a direction parallel with the axis (100) of the hub.

6. A drive hub according to claim 5, wherein the first toroidal disc (25) is rigidly disposed on the hub axle (1), the second toroidal disc is movably disposed on the hub axle (1), and the hub sleeve (9) is mounted for movement on the hub axle (1) in a direction parallel with the axis (100) of the hub.

7. A drive hub according to claim 5, wherein the pivot bearing is an angled ball bearing (31).

8. A drive hub according to claim 5, wherein at least one of the two hub end walls (56, 57) is braced, via a radial ball bearing (3, 5) with movement clearance in a direction parallel with the axis (100) of the hub.

9. A drive hub according to claim 8, wherein the radial ball bearing (3, 5) is constructed with a ball race having a radius of curvature of a ball contacting surface, which radius is larger than a radius of balls of the ball race, or with a cylindrical ball race.

10. A drive hub according to claim 4, wherein the coupling sleeve (43a) is provided with a coupling ring (33) braced at one end on the first toroidal disc (35) via an angled ball bearing (34) while at its other end it is braced on the hub sleeve (9) via the expanding coupling (20).

11. A drive hub according to claim 1, wherein the second toroidal disc (27) is rotationally rigidly connected to the driver (13) in the drive direction of rotation via a free wheel coupling (23).

12. A drive hub according to claim 11, wherein the free wheel coupling (23) is constructed as a ratched free wheel coupling.

13. A drive hub according to claim 1, wherein at least one pretensioning spring is provided biased at one end on the hub sleeve (9) and at the other on one of the two toroidal discs (25, 27) for pretensioning the two toroidal discs (25, 27) in the direction of each other.

14. A drive hub according to claim 13, wherein the pretensioning spring is constructed as a thrust spring (65) which at one end engages the inside of the second hub end wall (57) while at its other end it is biased on an outer ring (57) of the inclined ball bearing (31) inserted between the second hub end wall (57) and the second toroidal disc (27).

15. A drive hub according to claim 1, wherein the hub sleeve (9) encloses the friction gear (17) and consists of at least two parts (9, 57) which are bolted to each other.

16. A drive hub according to claim 1, wherein the first toroidal disc (25) is provided with a reaction moment lever (1a), adapted to be connected to a frame member of the vehicle to accommodate reaction moments.

17. A drive hub according to claim 1, wherein the control arrangement (47, 51, 53) comprises a linkage (53) guided within the hub axle (1) and a shifting element coupled articulatingly to the king pins (37) of the friction wheels (35), guided on the hub axle (1) and adapted for displacement along the hub axle (1) by means of the linkage (53).

18. A drive hub according to claim 17, wherein the shifting element comprises an outer bearing ring (47), an inner bearing ring (51) and a ball bearing (49) connecting the outer bearing ring to the inner bearing ring.

19. A drive hub according to claim 1, wherein the friction wheels (35) are mounted in pivot frames (39) which are mounted in the friction wheel carrier (43) by means of bearing pins (42) so that they can pivot about a respective pivot axis (41).

20. A drive hub according to claim 19 wherein the pivot frames (39) are provided with levers (39c) which engage the outer bearing ring (47) at a point of application of which the distance from the pivot axis (102) of the pivot frames (39) corresponds substantially to the distance between the axis (100) of the hub and the pivot axis (41) of the pivot frames (39).

* * * * *

UNITED STATES PATENT AND TRADEMARK OFFICE
CERTIFICATE OF CORRECTION

PATENT NO. : 5,273,501
DATED : December 28, 1993
INVENTOR(S) : Ulrich Schievelbusch It is certified that error appears in the above-identified patent and that said Letters Patent is hereby corrected as shown below:

<u>Col. 6, line 66</u>, "diameter d" should read --diameter $d_1$--;
<u>Col. 7, line 5</u>, "of 10" should read --of--;
<u>Col. 7, line 25</u>, "The coupling..." should start a new paragraph;
<u>Col. 8, lines 7 and 8</u>, "designated in FIG. 2 as Track curve and heads 45 became displaced, describing a spatial curve" should read --heads 45 become displaced, describing a spatial curve designated in FIG. 2 as Track curve and--;
<u>Col. 9, line 61</u>, "braced, via" should read --braced via--.

Signed and Sealed this

Fifth Day of July, 1994

Attest:

BRUCE LEHMAN

*Attesting Officer*     *Commissioner of Patents and Trademarks*